United States Patent
Duane et al.

(10) Patent No.: US 8,751,827 B1
(45) Date of Patent: Jun. 10, 2014

(54) APPARATUS FOR CONTROLLING EMBEDDED SECURITY ON A STORAGE PLATFORM

(75) Inventors: William M. Duane, Westford, MA (US);
Robert W. Griffin, Hollis, NH (US);
John S. Harwood, Paxton, MA (US);
Gregory W. Lazar, Upton, MA (US);
Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 447 days.

(21) Appl. No.: 12/823,636

(22) Filed: Jun. 25, 2010

(51) Int. Cl.
*G06F 11/30* (2006.01)
*G06F 3/12* (2006.01)
*H04L 12/417* (2006.01)
*H04L 9/08* (2006.01)

(52) U.S. Cl.
CPC ............ *G06F 3/1204* (2013.01); *H04L 12/417* (2013.01); *H04L 9/0894* (2013.01)
USPC ........... 713/193; 713/159; 713/185; 713/172; 726/5; 726/9; 726/20

(58) Field of Classification Search
CPC .......... G06F 3/1204; G06F 2221/2153; H04L 12/417; H04L 9/0894
USPC .......... 713/150, 185–193, 159, 172; 726/185, 726/20, 5–9
See application file for complete search history.

(56) References Cited

U.S. PATENT DOCUMENTS

| | | | |
|---|---|---|---|
| 7,752,445 B2 * | 7/2010 | Satoh | 713/173 |
| 2007/0006290 A1 * | 1/2007 | Li | 726/9 |
| 2009/0049307 A1 * | 2/2009 | Lin | 713/185 |
| 2009/0100265 A1 * | 4/2009 | Tadokoro | 713/172 |

\* cited by examiner

*Primary Examiner* — Venkat Perungavoor
*Assistant Examiner* — Amir Mehrmanesh
(74) *Attorney, Agent, or Firm* — BainwoodHuang

(57) ABSTRACT

A method of securely operating a computerized system includes forming a connection to a user-removable physical security device (PSD) which is uniquely paired with the computerized system and which stories cryptographically secured data required for performing a protected function on the computerized system. The PSD may be realized as a USB or similar peripheral device containing security-related data and potentially security processing capability as well. The protected function could be decrypting of encrypted data encryption keys used to encrypt/decrypt user data for example. A user who has an established association with the PSD (e.g. by some preceding registration process) is authenticated, resulting in activation of the PSD on the computerized system. Upon such activation of the PSD, the computerized system engages in a security operation using the cryptographically secured data from the PSD to enable the protected function to be performed under control of the user on the computerized system.

30 Claims, 2 Drawing Sheets

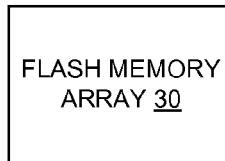
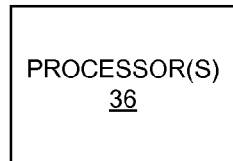
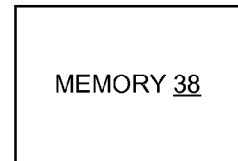
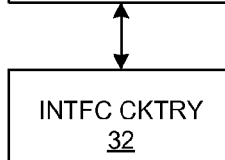
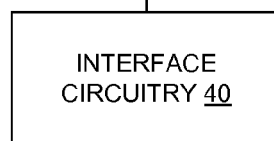
Fig. 3
Fig. 4
Fig. 5

US 8,751,827 B1

APPARATUS FOR CONTROLLING EMBEDDED SECURITY ON A STORAGE PLATFORM

BACKGROUND

The present invention is related to the field of data security in data processing systems.

There is increasing need for data security in data processing systems. Current techniques for meeting this need include hardware-level encryption of user data, for example, which can help protect the user data even in the event that it is obtained by an unauthorized party. Large, enterprise-level data processing systems (including enterprise storage systems) that provide user data encryption generally utilize a large number of data encryption keys, and require resources for the secure creation, distribution, use and destruction of these keys. Many systems may employ one or more dedicated key management server systems which are responsible for such key management activities, desirably minimizing the need for specialized key management functionality on the production servers of a system and its potential performance and system management drawbacks. Beyond hardware data encryption, there are other data security applications in which it is known to employ dedicated external resources such as dedicated server systems.

SUMMARY

Data security techniques which rely on separating specialized functionality into separate server systems may have excessively high cost and complexity for many data processing applications, for example in smaller data process systems and/or systems being otherwise cost sensitive. Adding the complexities of an external server might increase total cost of ownership to the point that a data center administrator is forced to weigh tradeoffs of security versus cost and system complexity when building small installations. The disclosed apparatus and methods are in part motivated by a need for data security in these kinds of applications.

A method of securely operating a computerized system includes forming a connection to a user-removable physical security device (PSD) which is uniquely paired with the computerized system and which stores cryptographically secured data required for performing a protected function on the computerized system. In one type of embodiment the PSD may be realized in the form of a USB or similar peripheral device containing security-related data and potentially security processing capability as well. An example of a protected function is the decrypting of encrypted data encryption keys used to encrypt/decrypt user data. The method further includes authenticating a user (e.g., an administrative user) who has an established association with the PSD (e.g. by some preceding registration process). Successful authentication results in activation of the PSD on the computerized system. Upon such activation of the PSD, the computerized system engages in a security operation using the cryptographically secured data from the PSD to enable the protected function to be performed under control of the user on the computerized system.

By the disclosed technique, data security can be achieved employing the benefits of a physically separate device (the PSD) without incurring the cost and complexity of a separate dedicated server system. The requirement for presence and operation of the PSD creates a higher barrier for unauthorized access, as an unauthorized party needs to have physical possession of the PSD as well as knowledge of whatever information is required for authentication. There can be considerable flexibility in how the PSD is used, especially if the PSD is of a "smart" variety having processing power as well as data storage. For example, the PSD may itself include a security processor capable of performing security-related functions so that sensitive data (such as encryption keys) need not be exposed outside the PSD.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 and FIG. 4 are hardware block diagrams of different embodiments of a PSD; and FIG. 5 is a flow diagram illustrating high-level operation of a computerized system with a PSD.

DETAILED DESCRIPTION

Figure 1:
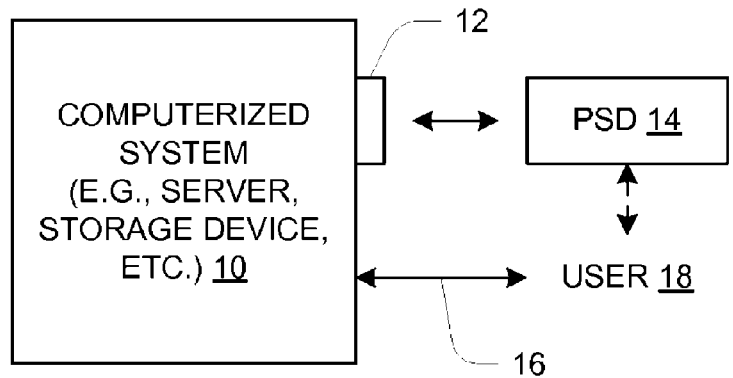
FIG. 1 is a block diagram showing a computerized system used with a physical security device (PSD)

FIG. 1 shows a computerized system 10, such as a server, storage device, etc., having a physical communications port 12 for making a connection to a physical security device (PSD) 14. The computerized system also has an interface to a communications link 16 for communicating with a user 18, such as a system administrator, operator, technician, etc. The PSD 14 is a user-removable device which is both uniquely paired with the computerized system 10 and administratively associated with the user 18, who is authorized to use the PSD 14 to enable either selected operations or even overall operation of the computerized system 10. In this context, "user-removable" refers to both portability (small and lightweight) as well as modular connectability (easily insertable and removable to/from a user-accessible physical port such as a USB port, Ethernet port, wireless port etc. of the computerized system 10). A good example of a physical realization of the PSD 14 is a palm-size device with a USB connector and a housing in which an electronic circuit module is disposed, similar to a so-called "memory stick" or "USB memory" device.

Generally, operation of the system of FIG. 1 involves the user 18 connecting the PSD 14 to the port 12, and the computerized system 10 using data stored on the PSD 14 (as well as information from the user 18) to enable certain protected operations to be performed on the computerized system 10 by the user 18. The scope of protection may be anywhere in a range from very specific (e.g., allowing the user 18 to perform some specific configuration command not otherwise permitted) to very general (e.g., enabling overall operation of the computerized system 10). As one specific example, the computerized system 10 may be a storage device (e.g., storage array or controller) of a storage system which provides encrypted data storage for other system elements (servers, etc.). The PSD 14 may store encrypted versions of master keys that are required to enable the storage device to decrypt a set of data encryption keys that are used to encrypt/decrypt the user data stored by the storage system. In such a system, the storage device can only operate as intended upon accessing and using the encrypted master keys stored on the PSD 14 to encrypt/decrypt the lower-level data encryption keys. In this type of application, the PSD can itself be viewed as a "key" required for system operation in a manner somewhat analogous to an ignition key of an automobile.

It is generally desirable that there be some level of protection of the association between the PSD 14 and the user 18 to prevent unauthorized use of the PSD 14. This protection can be accomplished in any of a variety of known ways, including for example a password or PIN which is known to the user 18. The password/PIN may be stored on and checked at the PSD 14. In some cases the checking procedure may be performed by the computerized system 10 (perhaps using a checking routine obtained from the PSD 14 itself), while in other cases it may be performed by the PSD 14 itself in direct communication with the user 18. This latter approach requires that the PSD 14 include a user interface, which may be provided in some embodiments as discussed below.

Before the computerized system 10 relies upon the presence of the PSD 14 to enable one or more protected functions, it may perform an authentication procedure in which the user 18 is required to provide the password or PIN, and the value provided by the user 18 is verified or validated using techniques generally known in the art. Only if such verification/validation is successful is the use of the PSD 14 by the user 18 deemed to be authorized, enabling the data on the PSD 14 to be used for the intended protected functions (such as decrypting data encryption keys in the example above). Additional details and examples of the use of the PSD 14 for a variety of purposes are described below.

"Unique pairing" between the PSD 14 and the computerized system 10 refers to the creation and maintaining of a persistent, globally unique correspondence between them. By using such a pairing, a given PSD 14 can only be used to enable operations on the computerized system 10 with which it is paired, providing an additional aspect of security. The unique pairing may be a one-to-one pairing, such that each PSD 14 only enables operation of a particular computerized system 10 and each computerized system 10 is only enabled by one particular PSD 14. This kind of regime may be needed, for example, in connection with key-management aspects of encrypted data storage. In other cases it may be desirable to broaden the scope of the pairing to promote other system goals without unduly sacrificing security. For example, a given PSD 14 may serve as a system-level device that can be used with any of a group of computerized systems 10 within a single administrative control domain, such as under control of a corporate IT department for example. Also, a given computerized system 10 may recognize multiple different PSDs 14, either as alternatives for a given scope of protection or as separate keys for different sets of protected functions. For example, a computerized system 10 may recognize an "admin" PSD 14 required for high-level configuration operations (such as provisioning storage, deploying keys, establishing user authorizations, etc.) as well as a separate "maintenance" PSD required for maintenance-related operations such as executing diagnostics, providing system status information, etc.). Techniques by which the pairing can be established are described below.

Figure 2:
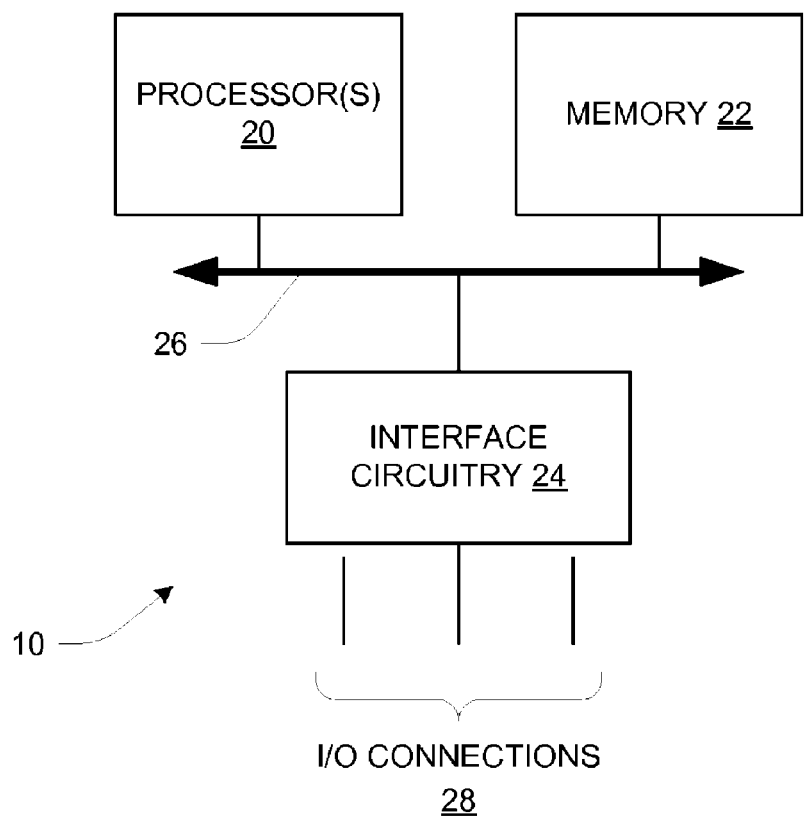
FIG. 2 is a hardware block diagram of a computerized system.

FIG. 2 provides a basic block diagram of the computerized system 10. It may include one or more processors (e.g., instruction execution units) 20, memory 22, and interface circuitry 24 coupled together by one or more system buses 26. The interface circuitry 24 provides an electrical interface to input/output (I/O) connections 28. The port 12 of FIG. 1 may be realized partly in the interface circuitry 24 (e.g., as USB circuitry, wireless communications circuitry, etc.). The interface circuitry 24 typically also provides interface(s) to external storage devices such as magnetic disk drives, flash drives, etc. The memory 22 includes generally volatile storage for data as well as programs executed by the processor(s) 20. In the case of a specialized computerized system 10 such as a storage device or controller, the interface circuitry 24 may include corresponding specialized interfaces such as FibreChannel etc., and the I/O connections 28 may include a number of high-speed storage-oriented interconnection buses such as FibreChannel. A storage device may also be connected into a so-called "storage area network" or SAN which is a local-area high-speed network tailored for storage operations in particular.

In one particular embodiment, the computerized system 10 is a storage device having internal key management functionality. While many higher-end encrypted storage systems employ dedicated key-management servers which carry out various aspects of encryption key management for a set of storage devices in a domain, some lower-end applications of encrypted storage may not be able to justify the cost and complexity of such separate dedicated key-management servers. In these cases, it is desirable to place key-management functions on the storage devices themselves. However, this kind of configuration raises security concerns, as a given storage device could possess all the functions required to enable an unauthorized person to access the encrypted data. For these kinds of applications, security is improved by placing at least part of the key-management functionality or critical key-management data on a separate physical device, such as the PSD 14. By doing so, an unauthorized user would need physical and operational access to the computerized system 10 as well as possession of (and a password for) the PSD 14 to have any chance of accessing the encrypted data. For a given level of physical security measures, security is enhanced when successful operation depends on two or more separately secured items or sub-systems.

FIGS. 3 and 4 provide hardware block diagrams for two different types of PSD 14 (shown as 14-a and 14-b respectively). PSD 14-a has a relatively simple structure and limited on-board functionality, while PSD 14-b has a more complex structure and can have much richer functionality based on programming and configuration. More specifically, PSD 14-a includes a flash memory array 30 and interface circuitry 32 which functionally couples the flash memory array 30 to external connections 34 of the PSD 14-a. This device can be used to store pertinent data and perhaps processing routines, but the processor(s) 20 of the computerized system 10 are relied upon to actually execute any processes related to use of the data on the PSD 14-a (which in some cases may include processing routines that have been retrieved from the PSD 14-a). PSD 14-b is structured more like a computerized device, including processor(s) 36, memory 38, and interface circuitry 40 which functionally couples the PSD 14-b to external connections 42. The memory 38 generally includes some amount of both volatile and non-volatile storage for instructions as well as data, and may optionally include an extended amount of flash memory for larger storage capability, such as may also be provided by the PSD 14-a. The processor(s) 36 can be programmed to perform a variety of pertinent functions depending on the particular application; specific examples are discussed below. It will be appreciated that PSDs 14-a and 14-b as described herein are only examples, and that a PSD 14 may have any of a variety of hardware and data/firmware organizations depending on application.

In one specific type of embodiment, the PSD 14 may contain a security processor, a connection port, memory to hold internal programs of the PSD 14, and memory for storage of data including security parameters. This circuitry could be contained on a single specialized integrated circuit, for example, or distributed over multiple ICs arranged on a circuit board. As mentioned, in one variation the PSD 14 may have a significant amount of additional memory for storing information, which may resemble the functionality provided by so-called "flash drives". A security processor is a processor designed to perform security related operations, typically having enhancements to facilitate these security operations. Examples of these enhancements include, but are not limited to, secure key storage, key generation, support for cryptographic operations, and tamper resistant and/or tamper detecting design.

As also mentioned, any of a variety of schemes may be used to connect the PSD 14 to the computerized system 10. These include USB, wireless connections such as Bluetooth or Wireless USB, a smart card interface, or perhaps via network connection such as 802.3 or hardwired LANs. For a given connection scheme, the interface circuitry 32, 40 of the PSD 14 includes corresponding electronic circuitry (i.e., USB interface circuitry, wireless interface circuitry, etc.).

FIG. 5 provides a high-level description of operation of the computerized system 10 in connection with the PSD 14. This description is necessarily general, because there are potentially a large number of distinct applications which will generally differ in their specifics. Several example applications are discussed below in more detail.

Referring to FIG. 5, at 44 the computerized system 10 forms a connection to the PSD 14, which as previously described is user-removable, uniquely paired with the computerized system 10, and associated with an user 18 who is authorized to use the PSD 14. The PSD 14 stores cryptographically secured data (e.g., encrypted data) which is required for performing one or more protected functions on the computerized system 10. The data on the PSD is cryptographically secured to prevent its unauthorized use, and it is decrypted to obtain the cleartext data during authorized use of the PSD 14.

In the case of a simpler type of PSD 14-*a* (FIG. 3), the algorithm (decryption routine(s)) and keys for decrypting the secure data may be stored on the PSD 14-*a*. These are loaded into the computerized system 10 when the PSD 14-*a* is attached, and then the algorithm is executed using the processor 20 of the computerized system 10. In the case of a smarter PSD 14-*b* (FIG. 4), the algorithm and keys for decrypting the secure data may be stored in the PSD 14-*b*, and executed by the processor(s) 36 contained within the PSD 14-*b*. Generally, it would not be desirable to store the keys for the secure data on the computerized system 10—it is preferable that they be carried on the PSD 14. The decryption routine(s) might typically be stored on the PSD 14, but in some cases could be stored on the computerized system 10.

The unique pairing of the PSD 14 with the computerized system 10 may be done in a variety of ways. Generally, it is preferred that one or more "stable system values" or SSVs be used to compute one or more values which are unique to a given paired PSD 14 and computerized system 10. SSVs are numerical values that are unique to a given computerized system 10 and generally not subject to frequent change. An example of an SSV is the so-called system UUID which serves to uniquely identify an individual computer within the global network. It is desirable that whatever manner of pairing is used, it persist across upgrades, field replacement of components, etc. It may be desirable to use an entirely randomly generated number which has no dependence on any physical aspect of the computerized system 14. The SSV or other unique data item is used to generate a secret that is shared between the computerized system 10 and the PSD 14. Then during step 44 or another convenient early point in operation, the computerized system 10 and PSD 14 exchange information enabling the computerized system 10 and/or the PSD 14 to identify each other as being uniquely paired. In some cases, the information enables the computerized system 10 to identify the PSD 14 as being uniquely paired with it, but the reverse case is also possible—the information may be used by the PSD 14 to uniquely identify the computerized system 10 (in order to select the correct keys for example). Thus in some embodiments, the PSD 14 is uniquely identified, in others the computerized system 10 is uniquely identified, and in yet others each is uniquely identified to the other. Note that the smart PSD 14-*b* with appropriate programming might also perform a verification of the identity of the computerized system 10 for additional security.

The unique pairing may also occur as an implicit mechanism without requiring an explicit pairing mechanism such as described above. For example, the computerized system 10 may contain an encrypted item which can be successfully decrypted by the PSD 14. Successful decryption of this data establishes that the PSD 14 is paired to the computerized system 10. In this case there would be no need to form a unique identifier relationship between the PSD 14 and the computerized system 10, as the successful decryption of the item carries with it an implicit conclusion that both the PSD 14 and computerized system 10 are paired. Other techniques for implicitly establishing a pairing may be employed.

Referring again to FIG. 5, at step 46 the user 18 is authenticated, such as described above. This process may employ information stored on the PSD 14, although in a simpler PSD 14-*a* the actual execution of the code will occur on the computerized system 10. Once the user 18 is successfully authenticated, then additional information may be released to the computerized system 10 to allow or restrict the protected function(s) which the user 18 is to perform. At this point the PSD 14 is said to be "activated" on the computerized system 10.

At 48, upon the activation of the PSD 14 on the computerized system 10, the computerized system 10 (perhaps with co-processing by a smart PSD 14-*b*) engages in a security operation using the cryptographically secured data on the PSD 14 to enable the protected function(s) to be performed under control of the user 18 on the computerized system 10. In the case of a simple PSD 14-*a*, the PSD 14-*a* will contain the keys and the decryption code, either integrated into a single application or as separate objects. When the PSD 14-*a* is activated, the application will be activated, and the encrypted data of the computerized system 10 will be sent to the application where the data will be decrypted. The decryption keys are preferably not released generally to the computerized system 10, but rather only to the application which is logically part of the PSD 14-*a* (although it may be executed by the processor of the computerized system 10).

In the above example it is assumed that the simpler PSD 14-*a* is being used. In another embodiment which employs the higher-functionality PSD 14-*b*, the computerized system 10 conveys the encrypted data encryption keys to the PSD 14-*b* where they are decrypted and then returned to the computerized system 10 in cleartext form for use in data encryption/decryption operations. This type of embodiment has the advantage that the decrypted keys remain within the PSD 14 and are not exposed outside the PSD 14, which may enhance security. The use of a smart PSD 14-*b* can provide greater flexibility in how the protected function(s) are performed in order to meet system operational objectives.

While the above provides a relatively high-level description of structure and functionality, the remaining description provides additional details and specific alternative uses or configurations that can be employed. Much of the description is directed to systems in which the computerized system 10 is a storage array of the type used is corporate or departmental data centers, for example. It will be appreciated that many of the specifics may also apply to other types of systems, perhaps with appropriate minor functional changes. A first part of the description below is generally applicable to the storage array use, and a second part presents three distinct use cases which differ in certain specifics. In the following description, references to "storage array" or "array" are to be understood as references to an embodiment of the computerized system 10 which is configured and functions as a storage array.

Generally, when the PSD 14 is connected to a port on the storage array, the user 18 needs to authenticate to the PSD 14 in order to activate the PSD 14. A common example is that the user 18 would need to enter a PIN to activate the PSD 14.

The PSD 14 could contain secure service credentials (SSCs) of technicians who service the storage array. When an SSC technique is used, a service technician must authenticate to a manufacturer (or other responsible party) of the equipment being serviced and obtain a credential in order to perform service on a machine at a customer site. The credentials may have a specified lifetime, providing the technician access to the machine for only a limited period of time to perform service. Use of SSCs can enable a customer to identify personnel who have performed service, for example when the credential and service actions are logged in an audit log. If the SSCs are contained on the PSD 14, the technician can be authorized and actions logged based on the credentials on the PSD 14 that is inserted into a machine being serviced.

The PSD 14 could contain encryption keys needed to start operation of the storage array. These keys could decrypt the master secrets of the array. These secrets could be stored securely on the array itself, because the keys to decrypt the secrets are stored separately in the PSD 14.

Note that if the PSD 14 contains a security processor, then the encryption keys would not need to leave the PSD 14. At startup, the encrypted array master secret could be sent to the PSD 14 for decryption, and the PSD 14 then return the decrypted array master secret allowing the array to start.

The array could have policy on how to handle the removal of the PSD 14 after the array is started. In some cases, the PSD 14 could be removed after the array is started, and the array continues to operate. In other cases, continued presence of the PSD 14 is required, and removal of the PSD 14 causes operation of the array to cease. The policy settings controlling this behavior could be stored on the PSD 14 or the array, and if stored on the array could also be carried in the PSD 14.

The PSD 14 could be used in connection with patches and updates for the array to be applied by the user 18. These items could be stored in flash memory of the PSD 14 and transferred to the array. Alternatively, they could be downloaded off the internet in an encrypted form, and the PSD 14 could decrypt the items using internal keys.

The PSD 14 could contain tools and/or virtual machines (VMs) needed by the user 18 to manage or diagnose the array.

The PSD 14 can be used to store event logs, system configuration information, and other data needed to monitor or diagnose the array. This information could be uploaded onto the PSD 14 at the array and then carried back to a manufacturer of the array or to other locations as data stored on the PSD 14. Alternatively, the PSD 14 could encrypt this information when the PSD 14 is connected to the array, and then this information could be securely sent over the internet to a desired location (e.g., as a file transfer or e-mail).

Scenarios

Three use scenarios are described. The first is an "ignition key" model, in which the PSD 14 must be connected and activated in order to get the array to provide data. The second case is an extension of the first, where the PSD 14 must be connected to allow for management operations to be performed. The last scenario covers the case of an embedded key server in the array, as generally discussed above. In the following description, "password" includes similar authentication strings such as PINs.

1. An administrator requires the insertion of the PSD 14 to enable data access for an array, in addition to possible username/password entry. Policy can be set to allow for the PSD 14 to either be removed after data access is granted or require it to remain inserted. If the PSD 14 is allowed to be removed, the array will continue normal operations without the PSD 14 connected but cannot support data access after a reboot or initialization after a power cycle until the PSD 14 is re-connected. If the continued presence of the PSD 14 is required, then any removal of the PSD 14 will halt all array operations/data access, and re-connection of the PSD 14 is required to continue array operations.

In this scenario the following may be applicable:
  The PSD 14 is under the control of the user 18 and not generally available, therefore the array can only allow data access when the user 18 is present. The PSD 14 is securely paired to a specific array and not a general "key" used to enable all arrays.
  The user 18 requires the capability to clone the PSD 14 to prevent loss of data (due to inability to obtain decryption keys to decrypt user data) if the PSD 14 is lost, stolen or broken.
  The PSD 14 should maintain its pairing with the array through any repair or upgrade cycle. The replacement of a field-replaceable unit (FRU) on the array should not prevent the use of the PSD 14 for array operations.

2. The PSD 14 is required to be connected to enable an user 18 to perform a set of privileged commands (which may be configurable), in addition to possible username/password entry. Policy stated in the first scenario may govern the data access behavior. Policy can be extended to cover management operations, broken down by roles as defined at the management layer. In order to perform management operations, where some/all may be categorized by roles, the PSD 14 must be connected. Without the PSD 14 connected, management operations on the array cannot be performed. The PSD 14 is not the mechanism for authentication but could be used to augment some other authentication mechanism.

In this scenario the following may be applicable:
  The PSD 14 is under the control of the user 18 and not generally available, therefore the array can only be managed when the user 18 is present. The PSD 14 is securely paired to a specific array and not a general "key" used to enable all arrays.
  The user 18 requires the capability to copy the PSD 14 to prevent data loss if the PSD 14 is lost, stolen or broken.
  The PSD 14 should maintain its pairing with the array through any repair or upgrade cycle, and no FRU replacement on the array should impact the pairing of the PSD 14 to the array.

3. The user data on the array is encrypted and key management is local to the array, enabled by connection of the PSD 14. Array configuration (adding of any storage devices to the array configuration) requires communication with the PSD 14 to both generate a key for a new storage device as well as communicating an encrypted key to the array. The array persistently stores an encrypted key per storage device. On data access the array requires the paired PSD 14 to be connected, and may transmit the encrypted data encryption keys and receive decrypted data encryption keys in return. The decrypted keys only persist during normal operation and are cleared from memory of the array on power cycle or reboot. No plaintext keys are vaulted. In some variations, there may be provision for storing keys on the PSD 14 as well.

In this scenario the following may be applicable:

The PSD 14 is under the control of the user 18 and not generally available, therefore the array can only manage keys when the user 18 is present and the PSD 14 connected. The PSD 14 is securely paired to a specific array and not a general "key" used to encrypt all arrays.

The user 18 requires the capability to copy the PSD 14 to prevent data loss if the PSD 14 is lost, stolen or broken.

The PSD 14 should maintain its pairing with the array through any repair or upgrade cycle, and no FRU replacement on the array should impact the pairing of the PSD 14 to the array.

The user 18 requires the capability to export encryption keys to another array to support the ability to move disks between arrays. The key can be cloned (exported) on the source array and cloned (imported) on the destination array using a PSD cloning mechanism.

No plaintext keys are persistently stored on the array

As noted above, a "roles" construct may be employed for certain functions, including authorization. This provides for a layer of abstraction from specific individuals, which can enhance flexible operation of a system. For example, the computerized system 10 may enforce a policy dictating that only a user acting in the role of a system administrator can take certain actions (including, for example, using the PSD 14 to start operation etc.). Then any individual acting in such a role (according to known authorization) is permitted to take the specified actions. Whether or not roles are utilized, there can be a variety of ways in which the rights of roles or individuals can be identified, including:

1. Pre-configuring rights information on the computerized system 10
2. Configuring rights information on an external specialized server, such as a Lightweight Directory Protocol (LDAP) server, from which they can be retrieved by the computerized system 10 when needed.
3. Storing rights information on the PSD 14.

The above description of scenarios also refers to the need for cloning a PSD 14. This cloning can be supported in any of a variety of ways. For smart PSDs PSD 14-*b*, it may be possible to connect a source PSD 14 (the one to be cloned) with a blank PSD 14 and have the PSDs themselves interact with each other to achieve the cloning (copying data, etc.). This could also be done with some level of assistance by a host computer (such as computerized system 10) to which the two PSDs 14 are connected. Another approach is to maintain an image of a PSD 14 either on the computerized system 10 or elsewhere, and employ a process of downloading the image into a blank PSD 14. Suitable security precautions would preferably be employed to avoid unauthorized cloning.

Beyond the above, there may be other variations that could be desirable depending on application. Regarding authentication of the user 18, for example, it may be desirable to include a biometric sensor integrated into the PSD 14 to verify a fingerprint or some other physical characteristic of the user 18. The PSD 14 may include one or more mechanisms to signal status and other information to a user. This mechanism could range from a simple LED, to a character display for showing text output, to a small graphics display. As this signaling is local to the PSD 14 and independent of the computerized system 10, it could be used to signal that the PSD 14 has detected a problem with the computerized system 10 (such as detecting that it is not paired with the PSD 14, that it has somehow been damaged or corrupted, etc.). Additionally, it may be desirable to include one or more user input mechanisms on the PSD 14, such as a keypad for entry of a PIN or other data. This functionality could also help protect against a compromised computerized system 10. Additionally, the PSD 14 could contain a one-time password (OTP) token, similar to those sold under the trademark SecurID®, which could be used to enable the user 18 to log in to a remote network. As an example, a technician who is servicing a computerized system 10 at a customer location may need to access information stored at his/her office or home location, and the OTP token may be part of the authentication procedure employed for such a remote login.

Another use scenario that may be desirable is a "quorum use" case, in which m-of-n PSDs are related to systems 10 in the following manner:

a) For high-security applications, a strict set of PSDs is required to access system operation (m=n).

b) For multiple access and/or high availability (covers the cloning use case as well—as a predefined set of valid PSDs) the system will accept any combination of a minimum of m PSDs of a defined set of n.

While various embodiments of the invention have been particularly shown and described, those skilled in the art will know that various changes in form and details may be made therein without departing from the spirit and scope of the invention as defined by the appended claims.

What is claimed is:

1. A method of securely operating a computerized system, comprising:

forming a connection to a user-removable physical security device being uniquely paired with the computerized system and storing cryptographically secured data required for performing a protected function on the computerized system, the connection employing a first input/output interface of the computerized system;

authenticating a user having an established association with the physical security device, the authenticating resulting in activation of the physical security device on the computerized system; and only upon the activation of the physical security device on the computerized system, engaging in a security operation using the cryptographically secured data on the physical security device to enable the protected function to be performed under control of the user on the computerized system, the computerized system being a storage array of a storage system and the protected function being encrypted data storage operations provided by the storage array using external storage devices accessed via a second input/output interface of the storage array;

the storage array includes a security structure which contains keys and data needed by the storage array to protect and unprotect user data during the encrypted data storage operations, the security structure residing in a first memory of the storage array and being encrypted wholly or in part;

the cryptographically secured data being stored in a second memory of the physical security device and including one or more encryption keys needed to decrypt the security structure to permit use of a resulting cleartext security structure for use in protecting and unprotecting the user data; and the security operation includes obtaining the encryption keys from the second memory of the physical security device and using the encryption keys to decrypt the security structure to obtain the keys and data for use in the encrypted data storage operations.

2. A method according to claim 1, wherein the cryptographically secured data includes data expressing a pairing of the physical security device, and wherein the security operation includes performing a function on the cryptographically secured data which expresses a pairing of the computerized system, and wherein the protected function is enabled only if the security operation provides a result confirming that the pairing of the physical security device matches the pairing of the computerized system.

3. A method according to claim 1, wherein the unique pairing of the computerized system and the physical security device is established implicitly by successful operation of one or more functions involving both the physical security device and the computerized system.

4. A method of claim 3, wherein the one or more functions includes a cryptographic function.

5. A method according to claim 1, wherein the protected function includes enabling a normal operating mode in which the computerized system performs data processing functions for external requestors, and wherein the protected function includes enabling the normal operating mode.

6. A method according to claim 1, wherein the protected function includes periodically performing a re-enabling operation in which continued normal operation of the computerized system is re-enabled only if the physical security device is still activated on the computerized system, and further including ceasing the normal operation of the computerized system in the event that the physical security device is not present on the computerized system at any time of performing the re-enabling operation.

7. A method according to claim 1, wherein the unique pairing of the physical security device with the computerized system is made through use of a randomly generated globally unique stable system value.

8. A method according to claim 1, wherein the physical security device stores credentials for the user which are utilized in the authentication/authorization of the user.

9. A method according to claim 1, wherein the physical security device includes a processor operative to perform functions of the security operation without exposing sensitive cryptographic data stored on the physical security device, and wherein the method further includes interacting with the processor to initiate the performing of the functions by the processor.

10. A method according to claim 1, wherein the physical security device includes extended memory storing one or more of (1) software programs for use by the computerized system, and (2) data usable for configuring and/or diagnosing the computerized system, and wherein the method further includes uploading the software programs from the physical security device and executing the uploaded software programs, and/or performing a configuration or diagnostic process in which the data is transferred between the physical security device and the computerized system.

11. A method according to claim 10, wherein the software programs include programs selected from software updates, system tools, and virtual machines.

12. A method according to claim 1, wherein the physical security device includes a biometric sensor operative to receive user-identifying physical stimulus and obtain corresponding user-identifying data, and wherein authenticating includes using the user-identifying data to verify the identity of the user.

13. A method according to claim 1, wherein the physical security device includes user interface components enabling a direct exchange of data between the physical security device and the user.

14. A method according to claim 13, wherein the user interface components include a display and/or a keypad.

15. A method according to claim 13, wherein the physical security device is operative to perform a diagnostic for self checking and to report status from the diagnostic to the user via one or more of the user interface components.

16. A method according to claim 1, wherein the physical security device includes a one-time-password (OTP) token usable for authenticating the user to a remote system in which the user has access rights.

17. A method according to claim 16, wherein the method further includes engaging in an OTP-based authentication procedure with the remote system using the OTP token to permit the user to exercise the access rights on the remote system.

18. A method according to claim 16, wherein the physical security device includes mechanical and electrical interface components of a selected one of a Universal Serial Bus (USB) device, an Ethernet device, and a wireless device.

19. A method according to claim 1, wherein authenticating the user includes testing that the user knows predetermined information required to be presented to the computerized system for authenticating the user, the testing including receiving user-provided information and comparing it to the predetermined information separately available to the computerized system.

20. A method according to claim 19, wherein the information includes a password or personal identifying number, and wherein the testing includes receiving a user-provided password or personal identifying number and comparing it to the predetermined password or personal identifying number.

21. A method according to claim 20, wherein the predetermined password or personal identifying number is stored in the first memory, and wherein the testing includes retrieving the predetermined password or personal identifying number from the first memory for use in the comparing.

22. A method according to claim 20, wherein the predetermined password or personal identifying number is stored in the second memory of the physical security device, and wherein the testing includes retrieving the predetermined password or personal identifying number from the second memory of the physical security device for use in the comparing.

23. A method according to claim 19, wherein the predetermined information is first information stored on and retrieved from the physical security device as part of the comparing, and the cryptographically secured data is second information released to the computerized system for the security operation upon completion of the authenticating using the first information as retrieved.

24. A method according to claim 1, wherein the second interface is a FibreChannel interface connected to a FibreChannel storage-oriented interconnection bus.

25. A method according to claim 1, wherein the second interface connects the storage array to a storage area network.

26. A computerized system, comprising:
a processor;
a first memory;

interface circuitry providing first and second input/output interfaces; and one or more system buses coupling the processor, first memory and interface circuitry together, wherein the processor is operative to execute instructions from the first memory to perform a method of securely operating a computerized system, including:

forming a connection, via the first input/output interface of the interface circuitry, to a user-removable physical security device being uniquely paired with the computerized system and storing cryptographically secured data required for performing a protected function on the computerized system;

authenticating a user having an established association with the physical security device, the authenticating resulting in activation of the physical security device on the computerized system; and only upon the activation of the physical security device on the computerized system, engaging in a security operation using the cryptographically secured data on the physical security device to enable the protected function to be performed under control of the user on the computerized system, the computerized system being a storage array of a storage system and the protected function being encrypted data storage operations provided by the storage array using external storage devices accessed via the second input/output interface of the interface circuitry;

the storage array including a security structure which contains keys and data needed by the storage array to protect and unprotect user data during the encrypted data storage operations, the security structure residing in the first memory and being encrypted wholly or in part;

the cryptographically secured data being stored in a second memory of the physical security device and including one or more encryption keys needed to decrypt the security structure to permit use of a resulting cleartext security structure for use in protecting and unprotecting the user data; and the security operation including obtaining the encryption keys from the second memory of the physical security device and using the encryption keys to decrypt the security structure to obtain the keys and data for use in the encrypted data storage operations.

27. A computerized system according to claim 26, wherein the cryptographically secured data includes data expressing a pairing of the physical security device, and wherein the security operation includes performing a function on the cryptographically secured data which expresses a pairing of the computerized system, and wherein the protected function is enabled only if the security operation provides a result confirming that the pairing of the physical security device matches the pairing of the computerized system.

28. A computerized system according to claim 26, wherein the protected function includes enabling a normal operating mode in which the computerized system performs data processing functions for external requestors, and wherein the protected function includes enabling the normal operating mode.

29. A computerized system according to claim 26, wherein the second interface is a FibreChannel interface connected to a FibreChannel storage-oriented interconnection bus.

30. A computerized system according to claim 26, wherein the second interface connects the storage array to a storage area network.

* * * * *